G. BUELNA.
HYDRANT.
APPLICATION FILED DEC. 13, 1916.
1,246,389.
Patented Nov. 13, 1917.
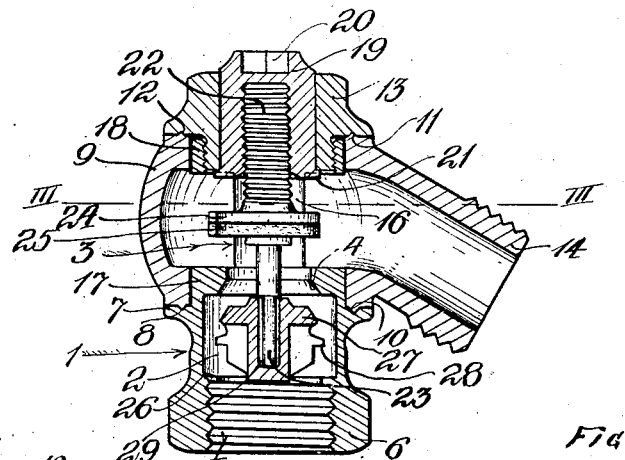
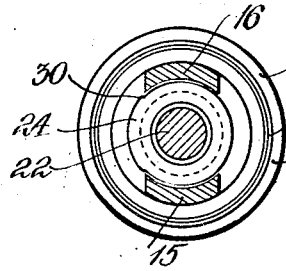
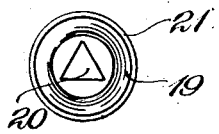
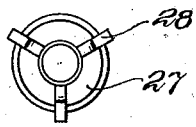
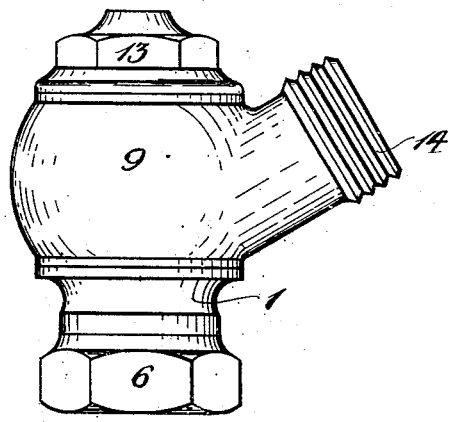
WITNESSES:
Frank Hawthorn.
J. H. Cushing
INVENTOR:
GUADALUPE BUELNA.
By
ATTY.

UNITED STATES PATENT OFFICE.

GUADALUPE BUELNA, OF SANTA BARBARA, CALIFORNIA.

HYDRANT.

1,246,389.  Specification of Letters Patent.  Patented Nov. 13, 1917.

Application filed December 13, 1916. Serial No. 137,739.

*To all whom it may concern:*

Be it known that I, GUADALUPE BUELNA, a citizen of the United States, residing at Santa Barbara, county of Santa Barbara, and State of California, have invented a certain new and useful Improvement in Hydrants, of which the following is a specification.

My invention relates to a hydrant, and has especial reference to that class generally used for sprinkling purposes, one of the objects of the invention being to provide a hose connection in which the flexible water conduit may be moved about in any radial direction without straining the connection, kinking or unduly bending the conduit or interfering with the flow of water therethrough.

A further object of my invention is to provide a hydrant of few parts that may be readily assembled and dissociated; and that will not require removal from the main line when making repairs, or substitutions of worn or broken parts, and in which the flow of water is automatically stopped before dissociation.

Another object of this invention is to provide a hydrant with an adjustable hose connection whereby to control the direction of the outflow of water.

These objects are attained by a form of the invention illustrated in the accompanying drawing, in which.

Figure 1 is a section showing my invention, the hose connection being shown in downwardly directed position and the valves being shown unseated.

Fig. 2 is an elevation, the hose connection being shown upwardly directed.

Fig. 3 is a section on line III—III Fig. 1, omitting the hose connection.

Fig. 4 is a plan view of the key socket in the hydrant plug, and

Fig. 5 is a bottom plan view of one of the valves.

My invention comprises a body 1, formed with a valve-chamber 2, and a valve cage 3, the valve chamber having an interior beveled seat 4; threads 5 for connection with a main, and a nut portion 6, for a wrench.

The valve body 1 is provided with an annular projecting shoulder 7, having an annular groove 8, preferably V-shaped in cross-section, and forming a water-tight swivel seat for a hose connection, the body 9, of which is formed with beads 10 and 11, corresponding to the shape of the groove 8 on the shoulder 7, and with groove 12 formed in a nut 13, which coöperates with the shoulder in swiveling the hose body. This hose body 9 is provided with a threaded hose connection 14, extending preferably at an angle to the horizontal axis of the hose body, which as seen, is reversible according to the direction of the hose connection desired.

The cage 3, consists of two oppositely disposed walls 15 and 16, forming integral extensions of a cylindrical part 17 of the valve chamber 2, and of a cylindrical portion 18, that are spaced by said walls.

The outer walls of the cylindrical portions of the cage form the bearing for the swiveling hose connection 9. The interior of the cylindrical portion 18 is threaded to receive the threaded end of the nut 13, whose function is to secure the hose body in swiveling position and to form a guide and stop for the plug 19, fitting in said nut and provided with a key socket 20, and with a shoulder 21 for abutment against the nut 13. Said plug 19 is provided with an interior left hand thread for engagement with a threaded end 22 of a valve stem 23, which carries a valve disk 24 and washer 25, which latter is arranged to seat on the top of the aforementioned cylindrical portion 17 of the valve chamber, when caused so to do by the manipulation of the plug 19 to shut off the flow of water.

The valve chamber 2 is also provided with an annular ledge 26, on which a valve 27, through its lugs 28, may rest, and be held in place when not in use. This valve is provided with a central socket 29, into which extends the stem 23, by which it is guided.

The valve disk 24 and washer 25 is provided with a means, as a shoulder 30, for engaging the walls 15 and 16 and preventing revolution during the rotatory operation of the plug 19.

The parts as shown in Fig. 1 are in operative position and the water is flowing through the hydrant, the valve 27, having been lifted and being held in the position shown by the inflowing water, and the valve 24 occupying the position substantially central of the cage 3, which is the full open position. By manipulation of the plug 19, the valve stem 23, through the medium of the threaded end 22, is moved in one direction to open the valve and govern the amount of water passing through and in another direction to close the valve.

When the washer 25 becomes worn, or any other part of the mechanism is to be substituted or repaired, or the hose connection is to be inverted, the dissociation of the assembled units, without shutting off the flow of water in the main, is accomplished as follows:—

By manipulation of the plug 19 in the proper direction, the stem 23 is operated and the valve 24 thereon moved to the highest position. During such movement of the stem, the pressure of the water causes the valve 27 to travel with it, but such valve 27, seating on the seat 4 before the valve 24 has reached the limit of its movement, automatically shuts off the flow of water. Thereupon the nut 13 may be removed, and the balance of the parts may then be dissociated, while the valve 27, is firmly seated.

When the hydrant is not attached to a water main, the valve 27, normally rests on the ledge 26, being guided by the stem 23, which extends loosely in the socket 29 of such valve.

What I claim, is:—

1. A hydrant comprising a body having a swiveling invertible hose connection thereon, and a valve to govern the flow of water therethrough.

2. A hydrant comprising a body having a swiveling invertible hose connection thereon, a valve in said body to control the flow of water therethrough, and means automatically to shut off the flow of water during the dissociation of said connection.

3. A hydrant comprising a body, a swiveling invertible hose connection on said body, a valve stem in said body, a valve disk on said stem, means to operate said valve stem to cause the disk thereon to govern the flow of water through said connection, and means loosely fitting on and held against the end of said stem by water pressure also to govern the flow of water through said connection and to shut off the flow of water during dissociation of the hose connection.

4. A hydrant comprising a body adapted for attachment to a water main, a swiveling invertible hose connection on said body, a valve stem in said body, a valve disk on said stem, means to operate said stem to cause the disk thereon to govern the flow of water through said hose connection, and means loosely fitting on and arranged to be moved by said stem in one direction and moving under water pressure with said stem in another direction also to govern the flow of water through said connection and automatically to shut off the flow of water during dissociation of the hose connection.

5. A hydrant comprising a body having a swiveling hose connection thereon, a manually operable valve in said body to govern the flow of water through said connection, and an automatically operable valve to shut off the flow of water during dissociation of said connection.

6. A hydrant comprising a body having a swiveling hose connection thereon, a manually operable valve in said body to govern the flow of water through said connection, and a valve acting under water pressure automatically to shut off the flow of water during dissociation of said connection.

In testimony whereof I affix my signature in the presence of two witnesses.

GUADALUPE BUELNA.

Witnesses:
  J. I. CRUICKSHANK,
  JOHN P. HAESE.

Copies of this patent may be obtained for five cents each, by addressing the "Commissioner of Patents, Washington, D. C."